(12) United States Patent
Holcombe et al.

(10) Patent No.: US 7,502,214 B2
(45) Date of Patent: Mar. 10, 2009

(54) FLEXIBLE HOOK SWITCH DRIVER CIRCUIT

(75) Inventors: Wayne T. Holcombe, Mountain View, CA (US); Vitor Pereira, Azueira (PT)

(73) Assignee: Silicon Laboratories Inc., Austin, TX (US)

( * ) Notice: Subject to any disclaimer, the term of this patent is extended or adjusted under 35 U.S.C. 154(b) by 509 days.

(21) Appl. No.: 11/291,732

(22) Filed: Dec. 1, 2005

(65) Prior Publication Data
US 2006/0133602 A1    Jun. 22, 2006

Related U.S. Application Data

(60) Provisional application No. 60/633,389, filed on Dec. 3, 2004, provisional application No. 60/633,478, filed on Dec. 6, 2004.

(51) Int. Cl.
*H01H 47/00* (2006.01)

(52) U.S. Cl. .................................................... 361/160
(58) Field of Classification Search .................. 361/160
See application file for complete search history.

(56) References Cited

U.S. PATENT DOCUMENTS 6,073,050 A * 6/2000 Griffith ........................ 607/57

\* cited by examiner

*Primary Examiner*—Stephen W Jackson
(74) *Attorney, Agent, or Firm*—Francissen Patent Law, P.C.

(57) ABSTRACT

Disclosed is a switch driver circuit is shown where the circuit can control current driven devices and drive devices across a capacitive barrier. A mode control signal determines whether the circuit is in a current mode or a capacitive mode. In current mode, the circuit provides a current output signal at an output of the circuit in response to a subject signal, such as an ON switch control signal for a hook switch application. In capacitive mode, the circuit provides a clocked output signal at the output of the circuit in response to the subject signal, such that the clocked output signal can pass across a capacitive isolation barrier.

13 Claims, 2 Drawing Sheets

FLEXIBLE HOOK SWITCH DRIVER CIRCUIT

CROSS REFERENCE TO RELATED APPLICATIONS

This application claims priority to U.S. Provisional Patent Application No. 60/633,389 filed Dec. 3, 2004, entitled FLEXIBLE HOOK SWITCH DRIVER CIRCUIT, herein incorporated by reference in its entirety. This application also claims priority to U.S. Provisional Patent Application No. 60/633,478 filed Dec. 6, 2004, entitled TELEPHONE INTERFACE CIRCUITRY, herein incorporated by reference in its entirety.

BACKGROUND

Telephone line interface circuits typically include a hook switch circuit for conducting relatively large levels of current between the tip and ring terminals of the telephone line in order to generate an off-hook state. For example, when a computer initiates a telephone call, it drives the hook switch circuit, via interface circuitry, in order to activate the telephone line. These hook switch circuits exist on the line side of the telephone line interface circuitry, but are typically driven from the modem side of the interface circuitry. The modem and line sides of the telephone line interface circuitry are electrically isolated from one another and the hook switch circuit must be driven across the isolation barrier. The hook switch circuits are typically either current driven devices, e.g. an optoisolator, relay/transformer, or capacitive driven devices, where the isolation barrier is capacitive. Other types of circuits also involve electrical isolation barriers.

SUMMARY OF THE INVENTION

In an embodiment of a switch driver circuit, the circuit includes a first output driver having an input and an output coupled to a first output pin of the circuit and a first current source having an enable input and an output coupled to the first output pin, where the first current source is configured to source current from a power supply to the output responsive to the enable input. A logic circuit has a first input for receiving a subject signal, a second input for receiving a clock signal, a third input for receiving a mode control signal, a current control output coupled to the enable input of the first current source, and a first output coupled to the input of the first output driver. The logic circuit is configured to respond to a first state of the control mode signal by enabling the subject signal to modulate the clock signal for output to the first output of the logic circuit and disable the first current source through the current control output. The logic circuit is further configured to respond to a second state of the control mode signal by enabling the subject signal to control the first current source through the current control output, disable the clock signal, and output the subject signal through the first output of the logic circuit. In a further refinement of this embodiment, the first current source is a digital to analog converter having a digital control input coupled to at least one digital control input pin of the circuit for receiving a digital control value, where the digital to analog converter is configured to source current from the power supply to the output of the digital to analog converter responsive to the enable input and where a magnitude of the current sourced is scaled based on the digital control value.

An embodiment of a method for passing a subject signal across different types of isolation barriers calls for providing a first output for interfacing with the isolation barrier as well as receiving a mode control signal, a subject signal, and a clock signal. Responsive to a first state of the mode control signal, the method sets forth modulating the clock signal with the subject signal in order to drive the first output. Responsive to a second state of the mode control signal, the method calls for sourcing current to the first output responsive to the subject signal and driving the first output with the subject signal. A further refinement of this embodiment includes receiving a digital control value and the step of sourcing current to the first output responsive to the subject signal further includes scaling the current sourced to the first output based on the digital control value. In yet another refinement, the method sets forth providing a second output for interfacing with the isolation barrier and, responsive to the first state of the mode control signal, modulating the clock signal with the subject signal in order to drive the second output.

BRIEF DESCRIPTION OF THE DRAWINGS

Certain embodiments are described with reference to the following drawings, wherein.

DETAILED DESCRIPTION OF EMBODIMENTS

A switch driver circuit is shown that provides a two output pin switch driver that can be programmed to drive either a current driven circuit, e.g. a standard relay or opto-isolator, or a capacitive circuit, e.g. across a capacitive isolation barrier. One application for the switch driver is for a hook switch in a telephony circuit. The circuit drives across a capacitive isolation barrier by outputting a differential high frequency signal, e.g. ~1 MHz square wave, that is suitable for driving a capacitive hook switch circuit. The differential high frequency drive minimizes common mode noise, which can be a regulatory issue. The capacitors used in the present high frequency differential hook switch circuit are typically significantly cheaper isolation components than the opto-isolator. Even though the capacitive hook switch has more discrete components, it may be lower cost than the opto-isolator hook switch that requires a high voltage output opto transistor.

The present flexible hook circuit may also permit designers to select either a capacitive hook switch or a current driven hook switch depending on which solution works best in the particular application. In one embodiment of a flexible switch driver circuit, the circuit has two modes that enable it to drive two types of switches across an isolation barrier: capacitor switches and DC current driven switches, such as optocouplers, relays and solid state relays. In the embodiment shown, the isolation barrier is implemented by the switch part itself.

The present circuit may be applied to a variety of applications where an isolation barrier is present and a switch must be controlled across it, such as telephony (e.g. a hook switch driver), medical instrumentation and industrial process control.

Figure 1:
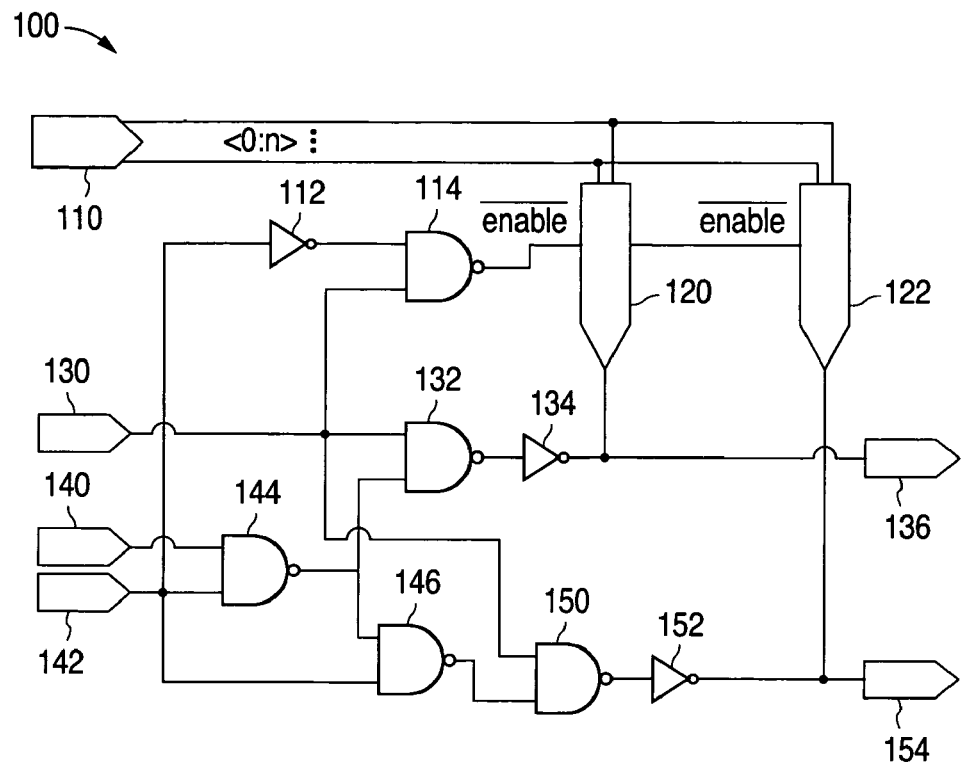
FIG. 1 is a logic circuit diagram of an embodiment of a flexible switch driver circuit.

FIG. 1 is a logic circuit diagram for an embodiment of a flexible switch driver circuit according to the present invention. In this example, an input to pin 130 is the subject signal that is to be transmitted across the isolation barrier. In the examples below, the subject signal is an ON switch signal for use in controlling a hook switch, but it may be other types of signals in both telephony and non-telephony applications. A mode control signal, e.g. capacitive mode control signal, input to pin 142 selects the mode of operation, e.g. logic high for capacitive or low-current mode and logic low for current mode. A clock signal input at pin 140 is used in a capacitive mode to transmit the subject signal across the capacitive barrier at a high enough frequency, e.g. 1 MHz, for the signal to pass across a capacitor.

To operate the circuit in capacitor switch mode, the capacitor switch input pin 142 is set to a logic high enabling a clock signal input at pin 140 to feed through AND gate 144. AND gate 146 functions as a gated inverter in order to introduce phase inversion between the outputs of the switch driver at output pins 136 and 154. Thus, when an ON switch signal at input pin 130 is a logical high, the output of buffers 134 and 152 will be two clock signals in phase opposition with the same frequency as the input clock. In other words, in this operating mode, the subject signal modulates the clock signal to produce the driver signals output by output drivers 134 and 152. Preferably, the clock signal is chosen so as to avoid introducing interference on the signal path across the isolation barrier. For example, in a modem application, the clock signal that is used for the switch driver circuit may be synchronized with the clock used to drive the modem's analog to digital converters and digital to analog converters. The current sources 120 and 122, which are digital to analog converters (DACs) in this example, are disabled in this mode because a current control signal generated by AND gate 114 is at a logic high, which disables the current DACs in this example. The complementary polarity of the two clock signals allows the drive capacity of both output drivers 134 and 152 to be utilized to drive the series connected npn and pnp transistors 170 and 172 in this example.

Figure 2:
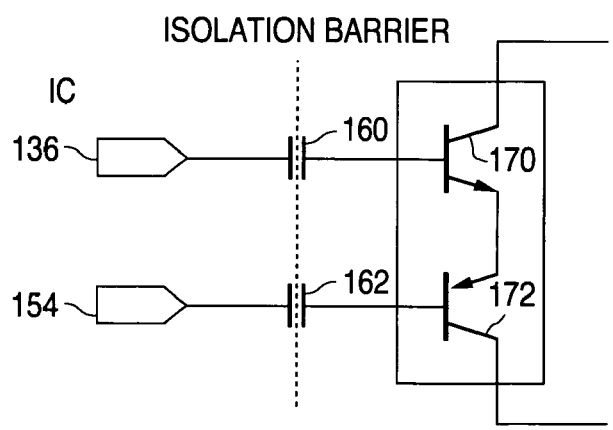
FIG. 2 is a simplified circuit diagram illustrating a capacitor switch mode where switches are driven across a capacitive isolation barrier.

As illustrated in the example of FIG. 2, the switch driver output signals at pins 136 and 152 drive two capacitors 160 and 162 that implement the isolation barrier. The other terminal of each of the capacitors 160 and 162 is connected, in the example shown, to a corresponding bipolar transistor 170 and 172, respectively, on the other side of the isolation barrier. The bipolar transistors 170 and 172 implement a switch that draws an off-hook signaling current from a tip and ring pair, in a telephone application, under the control of the on switch signal input at pin 130.

A current driven mode may also be selected by applying a logic low signal at pin 142. In the current driven mode, the circuit is configured to interface with a current driven switch, such as an optocoupler, relay, or solid state relay, e.g. a large transistors. For operation in current driven mode, the circuit is configured, in this example, such that the two switch driver outputs 136 and 154 may be connected together as a single current source. A logic low signal at input pin 142 forces the output of AND gate 144 to a logic high, which is input to AND gates 132 and 146 so that the logic of the on switch signal applied to input pin 130 determines the logic state of switch driver output pins 136 and 154. Forcing the output pins 136 and 154 to the same polarity allows the current sourcing and sinking capacity of both output drivers 134 and 152 to be utilized to drive the output pins.

Figure 3:
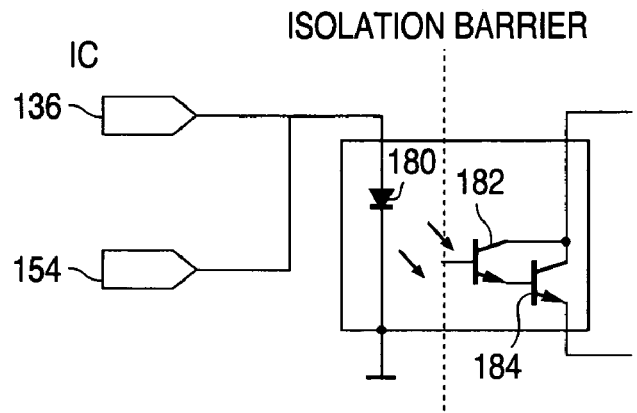
FIG. 3 is a simplified circuit diagram illustrating a current driven switch mode where switches are driven across an optoisolator based isolation barrier.

FIG. 3 illustrates a current driven application involving an optocoupler, wherein the output drivers 134 and 152, through output pins 136 and 154, drive a light emitting diode (LED) 180 on one side of the isolation barrier that is optically coupled to one or more phototransistors 182 and 184 on the other side of the isolation barrier. When the output drivers 134 and 152 are active in response to the ON switch signal applied to input pin 130, then current will run through LED 180 causing it to light up. The light from LED 180 will, in turn, cause current to flow in phototransistors 182 and 184.

The current supplied by the output drivers 134 and 152 of FIG. 1 is sometimes not enough to drive some of the switches referenced above. In order to supply the current needed to drive the external device, two current sources, e.g. digital to analog converters (DACs) 120 and 122, may be used. The current sources 120 and 122 are controlled by the subject signal input at pin 130 through AND gate 114 in the current drive mode. Thus, for example, when an ON switch signal applied to pin 130 is a logic high, current sources 120 and 122 are enabled and source current from a power supply to the output pins 136 and 154. When the ON switch signal is a logic low, the current sources 120 and 122 are turned off and output drivers 134 and 152 sink current from output pins 136 and 154.

In addition, the correct current value for various types of switches and for different parts in the same family of devices can be selected through the use of a current control code signal <0:n> input to DACs 120 and 122 via pin or pins 110. When the capacitor switch signal applied to input pin 142 is a logic low, the current DACs 120 and 122 are enabled via logic gates 112 and 114 and come under the control of the subject signal input at pin 130. The digital control value of the current control code signal <0:n> controls the amount of current provided by the DACs 120 and 122 to the switch driver output pins 136 and 154, respectively. Note that, in the preferred embodiment shown in FIG. 1, two DACs 120 and 122 are represented in order to distribute the current through two bondings for the output pins and to parallelize the electrostatic discharge (ESD) structures in order to reduce equivalent resistance.

Figure 5:
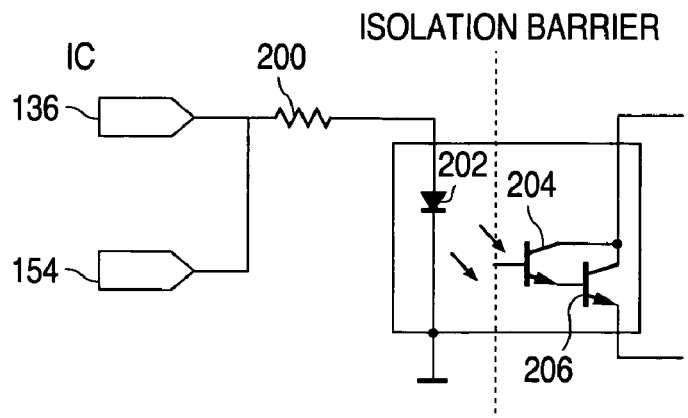
FIG. 5 is a simplified circuit diagram illustrating a current driven switch mode where switches are driven across an optoisolator based isolation barrier and an external resistor is utilized.

The simplest implementation of a DAC, e.g. DACs 120 or 122, is a single bit, low quality, low impedance current source. In one embodiment, the DAC is simply a single transistor operating in the triode region with a series resistor. This will generally produce a very inaccurate current. In order to adjust the current to its correct value, an external adjustment resistor 200 may be used, as illustrated in the embodiment of FIG. 5. More sophisticated and accurate DAC designs may also be utilized where higher accuracy in the drive current is desired.

In the current driven switch mode, the clock signal is blocked at AND gate 144 by setting the capacitor switch input signal to logic low, e.g. logic 0, which will also block the output phase inversion needed in the capacitive mode by forcing the output of AND gate 146 to a logic high, e.g. logical 1. In this embodiment, the PMOS transistors in drivers 134 and 152 will be on when the ON switch signal is high and the NMOS transistors will be on when ON switch signal is low and acting as a pull down.

Figure 4:
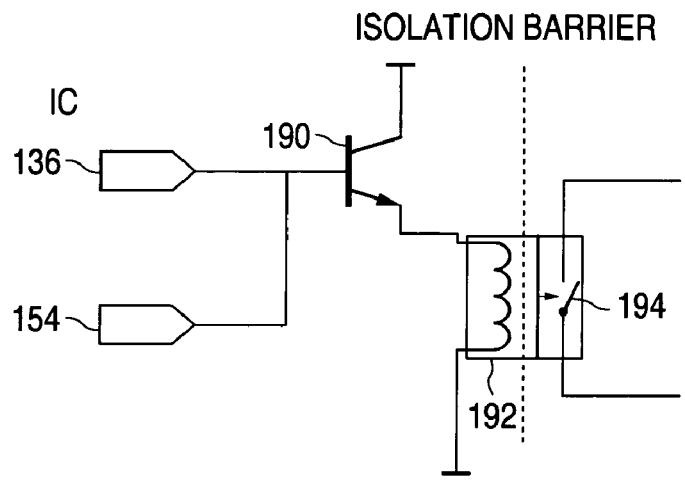
FIG. 4 is a simplified circuit diagram illustrating a current driven switch mode where switches are driven across a transformer based isolation barrier.

If high current capacity is not an issue, such as in the optocoupler examples shown in FIGS. 3 and 5, then a single DAC may be used. If, however, greater current is required than can be provided by DACs 120 and 122, then an external driver can be added to amplify it, as illustrated in the relay implementation shown in FIG. 4. In FIG. 4, the switch driver output signals at pins 136 and 154 are used to drive a bipolar transistor 190 coupled in series with a relay coil 192 in order to provide the current needed to drive the coil and operate switch 194.

The present circuit may be combined with the circuits described in the following commonly owned patent applications filed Dec. 3, 2004, herein incorporated by reference in their entirety: U.S. Patent Application No. 60/632,910 for Multiplexed Voltage Reference Strategy for Codec and its corresponding utility application U.S. patent application Ser. No. 11/291,733, which is now U.S. Pat. No. 7,164,377; U.S. Patent Application No. 60/633,051 for Flexible Hybrid Structure Tunable for Different Telecom Market Solutions and its corresponding utility application U.S. patent application Ser. No. 11/291,717; and U.S. Patent Application No. 60/632,839 for Ring Detect and Snoop Circuit and its corresponding utility application U.S. patent application Ser. No. 11/291,731.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

We claim:

1. A switch driver circuit, the circuit comprising:
    a first output driver having an input and an output coupled to a first output pin of the circuit;
    a first current source having an enable input and an output coupled to the first output pin, where the first current source is configured to source current from a power supply to the output responsive to the enable input;
    a logic circuit having a first input for receiving a subject signal, a second input for receiving a clock signal, a third input for receiving a mode control signal, a current control output coupled to the enable input of the first current source, and a first output coupled to the input of the first output driver,
    where the logic circuit is configured to respond to a first state of the control mode signal by enabling the subject signal to modulate the clock signal for output to the first output of the logic circuit and disable the first current source through the current control output, and
    where the logic circuit is further configured to respond to a second state of the control mode signal by enabling the subject signal to control the first current source through the current control output, disable the clock signal, and output the subject signal through the first output of the logic circuit.

2. The circuit of claim 1, where the first current source further comprises a digital to analog converter having a digital control input coupled to at least one digital control input pin of the circuit for receiving a digital control value, where the digital to analog converter is configured to source current from the power supply to the output of the digital to analog converter responsive to the enable input and where a magnitude of the current sourced is scaled based on the digital control value.

3. The circuit of claim 1, the circuit further comprising:
    a second output driver having an input and an output coupled to a second output pin of the circuit; and
    a second current source having an enable input coupled to the current control output of the logic circuit and an output coupled to the second output pin, where the second current source is configured to source current from the power supply to the output responsive to the enable input; and
    the logic circuit further includes a second output coupled to the input of the second output driver, and
    where the logic circuit is further configured to respond to the first state of the control mode signal by enabling the subject signal to modulate the clock signal for output to the second output of the logic circuit and disable the second current source through the current control output, and
    where the logic circuit is configured to respond to the second state of the control mode signal by enabling the subject signal to control the second current source through the current control output, disable the clock signal, and output the subject signal through the second output of the logic circuit.

4. The circuit of claim 3, where the logic circuit is still further configured to respond to the first state of the control mode signal by inverting the clock signal modulated by the subject signal for output to the second output of the logic circuit.

5. The circuit of claim 1, where:
    the first current source further comprises a first digital to analog converter having a digital control input coupled to at least one digital control input pin of the circuit for receiving a digital control value, where the first digital to analog converter is configured to source current from the power supply to the output of the first digital to analog converter responsive to the enable input and where a magnitude of the current sourced by the first digital to analog converter is scaled based on the digital control value; and
    the second current source further comprises a second digital to analog converter having a digital control input coupled to the at least one digital control input pin of the circuit for receiving the digital control value, where the second digital to analog converter is configured to source current from the power supply to the output of the second digital to analog converter responsive to the enable input and where a magnitude of the current sourced by the second digital to analog converter is scaled based on the digital control value.

6. A method for passing a subject control signal across different types of isolation barriers, the method comprising the steps of:
    providing a first output for interfacing with the isolation barrier;

receiving a mode control signal, a subject control signal, and a clock signal;

responsive to a first state of the mode control signal, modulating the clock signal with the subject control signal in order to drive the first output;

responsive to a second state of the mode control signal, sourcing current to the first output responsive to the subject signal and driving the first output with the subject control signal.

7. The method of claim 6, the method further including the step of receiving a digital control value and the step of sourcing current to the first output responsive to the subject control signal further includes scaling the current sourced to the first output based on the digital control value.

8. The method of claim 6, the method further comprising:
providing a second output for interfacing with the isolation barrier;

responsive to the first state of the mode control signal, modulating the clock signal with the subject control signal in order to drive the second output;

responsive to the second state of the mode control signal, sourcing current to the second output responsive to the subject control signal and driving the second output with the subject control signal.

9. The method of claim 8, where the step of modulating the clock signal with the subject control signal in order to drive the second output further includes inverting the clock signal as modulated by the subject control signal.

10. An apparatus for passing a subject control signal across different types of isolation barriers, the apparatus comprising:
first output means for interfacing with the isolation barrier;

means for sourcing current to the first output means under control of a current control signal;

means for receiving a mode control signal, a subject control signal, and a clock signal and, responsive to a first state of the mode control signal, modulate the clock signal with the subject control signal in order to drive the first output means and, responsive to a second state of the mode control signal, generate the current control signal responsive to the subject control signal and driving the first output with the subject signal.

11. The apparatus of claim 10, where the means for sourcing current to the first output means further comprises means for receiving a digital control value and scaling the current sourced to the first output means based on the digital control value.

12. The apparatus of claim 10, the apparatus further comprising second output means for interfacing with the isolation barrier and where the means for receiving further comprises:
means for modulating the clock signal with the subject control signal in order to drive the second output means when the mode control signal is in the first state; and means for sourcing current to the second output means responsive to the subject control signal and driving the second output with the subject control signal when the mode control signal is in the second state.

13. The apparatus of claim 12, wherein the means for modulating the clock signal with the subject control signal in order to drive the second output means further includes means for inverting the clock signal as modulated by the subject control signal.

\* \* \* \* \*